United States Patent [19]

Chelin

[11] 4,029,340

[45] June 14, 1977

[54] COMBINED TOWING AND MOUNTING MEMBER FOR VEHICLE COUNTERWEIGHTS

[75] Inventor: Charles Richard Chelin, Peoria, Ill.

[73] Assignee: Towmotor Corporation, Mentor, Ohio

[22] Filed: Mar. 15, 1976

[21] Appl. No.: 666,726

[52] U.S. Cl. .............................. 280/759; D12/60; 214/142

[51] Int. Cl.² ........................................ B60R 27/00

[58] Field of Search .................. 280/759, 758, 757; 214/127, 142; 248/364; 212/49; D12/60; D25/23, 25

[56] References Cited

UNITED STATES PATENTS

| 2,967,718 | 1/1961 | Orwig | 280/759 |
| 2,969,991 | 1/1961 | Ulinski | 280/759 |
| 3,023,024 | 2/1962 | McAdams et al. | 280/759 |
| 3,367,441 | 2/1968 | Schuster | 280/759 X |
| 3,787,086 | 1/1974 | Cosby | 280/759 X |
| 3,888,507 | 6/1975 | Berghausen | 280/759 |

Primary Examiner—Joseph F. Peters, Jr.
Assistant Examiner—Michael J. Forman
Attorney, Agent, or Firm—Wegner, Stellman, McCord, Wiles & Wood

[57] ABSTRACT

A vehicle including a frame with ground engaging terrain traversing wheels thereon. A counterweight is at one end of the frame and in abutment therewith and an eyebolt has its shank extending through the counterweight and attached to the frame with its head remote from the frame whereby the eye bolt (a) secures the counterweight to the frame, and (b) may serve as a towing eye.

5 Claims, 4 Drawing Figures

COMBINED TOWING AND MOUNTING MEMBER FOR VEHICLE COUNTERWEIGHTS

BACKGROUND OF THE INVENTION

This invention relates to vehicles and, more specifically, to counterweight structures for vehicles which may be employed for the purpose of towing other vehicles.

Prior art of possible relevance includes the following U.S. Pat. Nos. 3,367,441 issued Feb. 6, 1968 to Schuster et al; and 3,787,086 issued Jan. 22, 1974 to Cosby.

Many vechicles in use today employ counterweights for any of a variety of purposes. For example, vehicles such as cranes, lift trucks, backhoes, or the like, frequently employ counterweights at locations remote from their booms or masts to balance loads carried thereby. Frequently, too, tractors or the like may employ counterweights in proximity to their driven wheels, normally the rear wheels, for increasing traction.

Of course, tractors are generally intended for towing other vehicles or implements, while frequently lifting vehicles such as lift trucks are also employed for towing purposes.

Heretofore, it has been necessary to provide relatively elaborate structures where counterweights are secured to the rear of a vehicle if it also to be used for towing. Typically, passages or hooks or the like are cast into the counterweights whereby the draw bar of an implement or vehicle to be towed may be secured to an eye formed in the counterweight or passed through a portion of the counterweight to a hitch for the draw bar.

SUMMARY OF THE INVENTION

It is the principal object of the invention to provide a new and improved vehicle including a counterweight and provision for towing a vehicle or implement. More specifically, it is an object of the invention to provide an improved counterweight towing and mounting arrangement for use with vehicles.

An exemplary embodiment of the invention accomplishes the foregoing object in a vehicle including a frame with ground-engaging, terrain-traversing means thereon. A counterweight is disposed at one end of the frame and in abutment therewith and an eye bolt is provided with its shank extending through the counterweight to be attached to the frame. The head of the eye bolt is remote from the frame so that the eye bolt both secures the counterweight to the vehicle frame and may serve as a towing eye.

In one embodiment of the invention, the counterweight is provided with a recess oppositely of the vehicle frame and the head of the eye bolt is disposed within the recess.

Preferably, the recess is cross-shaped and the head of the eye bolt substantially fills one arm thereof.

In a highly preferred embodiment, the counterweight includes a downwardly open hook formation on the side thereof in abutment with the vehicle frame, which hook formation overlies and engages a portion of the frame at a location vertically spaced from the eye bolt.

The invention contemplates a counterweight and securing structure including a counterweight and an eye bolt configured as set forth in the preceding paragraphs.

Other objects and advantages will become apparent from the following specification taken in connection with the accompanying drawings.

DESCRIPTION OF THE PREFERRED EMBODIMENT

Figure 1:
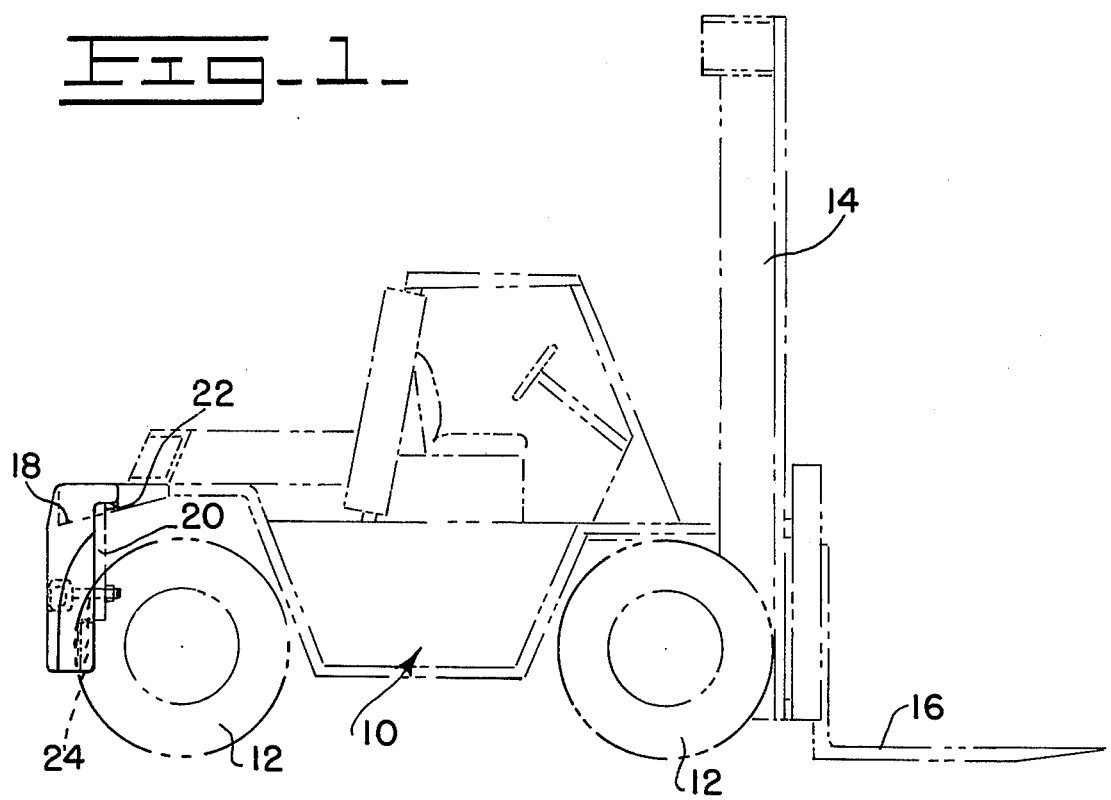
FIG. 1 is a side elevation of a vehicle, namely, a lift truck embodying the invention.

An exemplary embodiment of a vehicle made according to the invention is illustrated in FIG. 1 in the form of a lift truck. However, it is to be understood that the invention is not to be limited to lift trucks but is applicable to any type of vehicle which may require the use of counterweights and is regularly or occasionally employed for the purpose of towing vehicles or other implements.

The lift truck includes a frame, generally designated 10, mounting ground engaging wheels 12, whereby the same may travel over the underlying terrain. At the front of the lift truck there is a mast 14 mounting a fork 16 or the like which may be raised or lowered in a conventional fashion. For the purpose of counterbalancing forces imposed by loads received on the fork 16, a counterweight 18 is secured to a rear frame member 20 of the vehicle.

The counterweight 18 may be formed in any desired fashion. Typically, the same will be cast of metal.

According to the invention, one side of the counterweight in abutment with the frame member 20 is provided with a downwardly open hook formation 22 which overlies and abuts the frame member 20 to hook the counterweight 18 thereto. For purposes of completely securing the counterweight 18 to the frame member 20, an eye bolt 24 is passed through a bore 26 in the frame member 20 (FIGS. 3 and 4) to have its threaded shank 28 threadably received in a nut 30.

Figure 2:
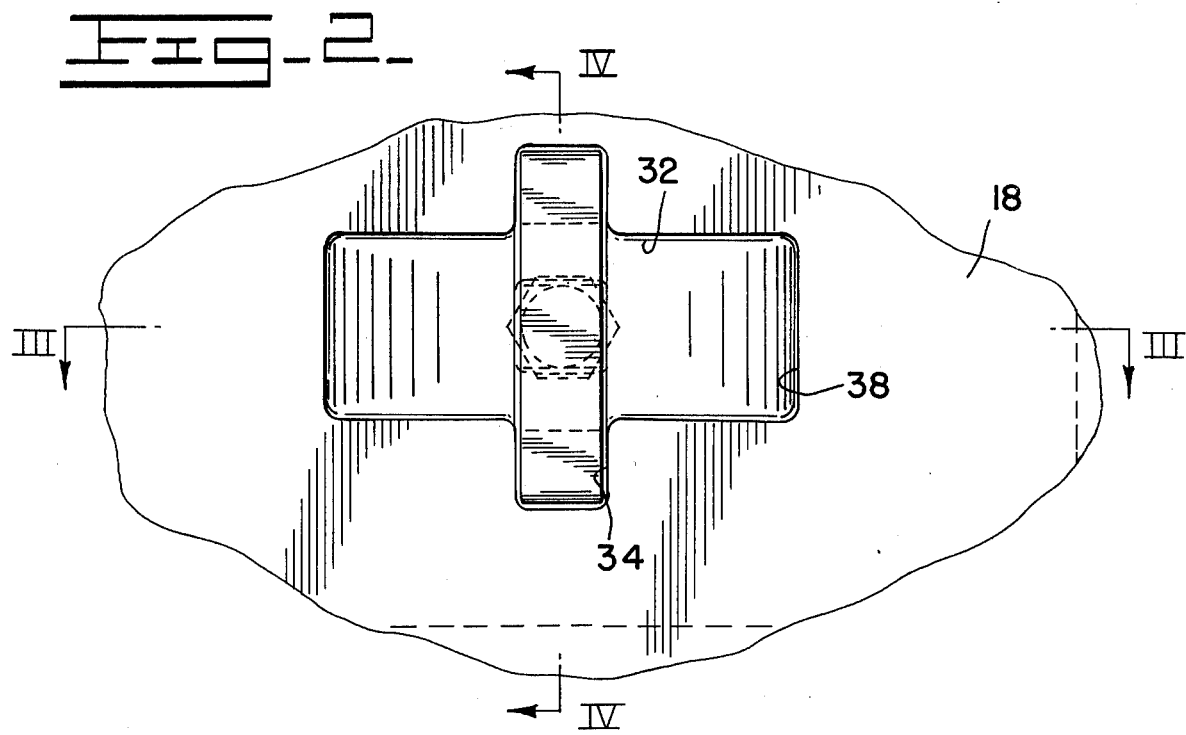
FIG. 2 is an enlarged, fragmentary view of a portion of the counterweight structure employed on the vehicle in FIG. 1 from the rear thereof.
Figure 3:
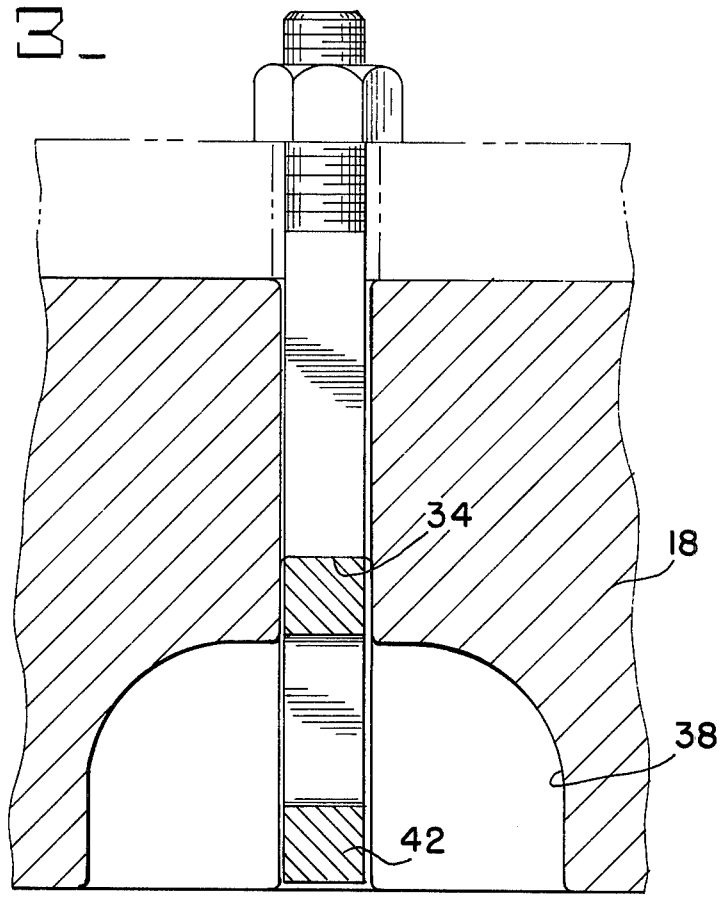
FIG. 3 is a horizontal section taken approximately along the line 3—3 of FIG. 2.
Figure 4:
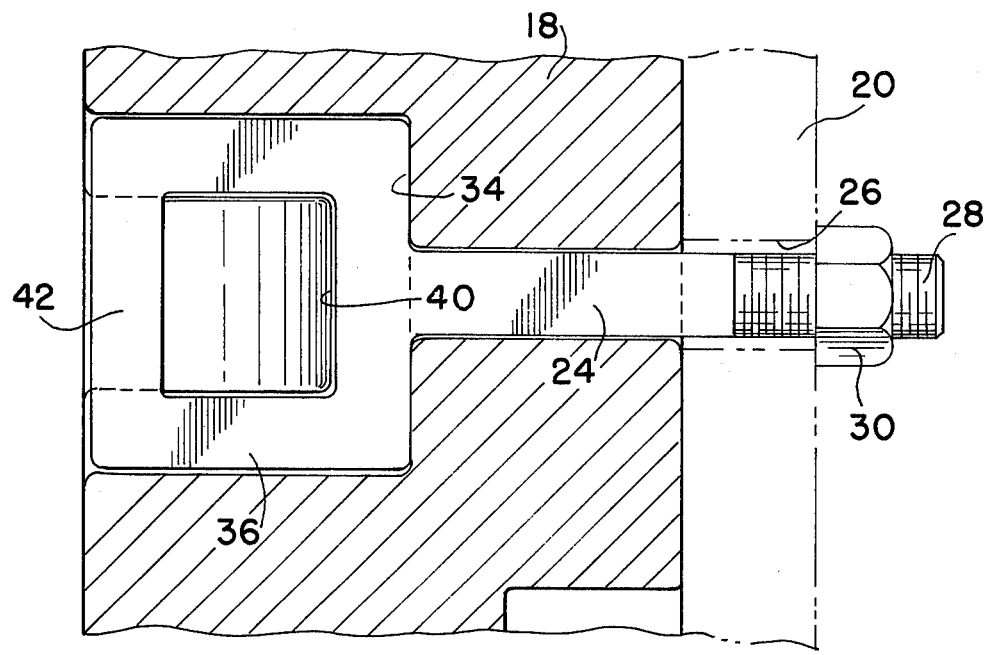
FIG. 4 is a vertical section taken approximately along the line 4—4 of FIG. 2.

As best seen in FIGS. 2–4, the center of the counterweight 18, at a location spaced from the hook formation 22, is provided with a cross-shaped recess 32. The recess 32 includes one cross arm 34 having a depth equal to the length of the head 36 of the eye bolt 24. The other cross arm 38 of the eye bolt has a lesser depth equal approximately to the length of the opening 40 in the head 36 of the eye bolt plus the thickness of the end 42 of the eye bolt head 36.

As can be seen, the dimensions are such that the head 36 of the eye bolt is snugly received within the arm 34 of the recess 32 and the end of the head 36 is substantially flush with the side of the counterweight 18 remote from the frame member 20. As a consequence, a towing eye is defined whereby a hook or the like may be passed through the opening 40 in the head 36 of the eye bolt. Thus, the eye bolt 24 performs a two-fold function. In addition to serving as a towing eye, it secures the counterweight 18 to the vehicle.

It is also to be observed that the configuration of the recess 34 tends to support the sides of the head 36 of the eye bolt against bending forces caused when the vehicle turns and is pulling a tow.

It will be appreciated that a counterweight construction made according to the invention eliminates many of the difficulties heretofore presented by prior art constructions in terms of casting openings or passages therein for receipt of draw bars or to allow access to hitches. At the same time, the need for special securing means is minimized.

It will also be appreciated that the counterweight is readily removable from the vehicle simply by removing the nut 30 from the eye bolt 24 and lifting the counterweight 18 such that the hook formation 22 clears the upper edge of the frame member 20.

What is claimed is:

1. A vehicle comprising:
   a frame;
   ground-engaging, terrain-traversing means on said frame;
   a counterweight at one end of said frame and in abutment therewith; and
   an eye bolt having a threaded shank extending generally horizontally through said counterweight and attached to said frame with its head remote from the frame;
   whereby said eye bolt (a) secures said counterweight to said frame, and (b) may serve as a towing eye.

2. The vehicle of claim 1 wherein said counterweight includes a recess and the head of said eye bolt is within said recess.

3. The vehicle of claim 1 wherein said counterweight includes a cross-shaped recess in the side thereof remote from said frame and a bore extending through said counterweight from said recess and said eye bolt is sized to be received in one of the arms of said cross-shaped recess with the head thereof substantially filling the same.

4. A counterweight and towing structure for attachment to a vehicle comprising an enlarged counterweight structure including, on one side thereof, a downwardly open hook formation adapted to abut and overlie a part of a vehicle frame and a bore extending through the counterweight structure; and an eye bolt having a threaded shank extending through said bore and adapted to be threadably received by a vehicle frame for securing the counterweight structure to the vehicle frame, the head of the eye bolt serving as a towing eye.

5. The counterweight and towing structure of claim 4 wherein said counterweight, structures on a side opposite from said hook formation, and about said bore is provided with a recess receiving said head of said eye bolt.

* * * * *

UNITED STATES PATENT AND TRADEMARK OFFICE
CERTIFICATE OF CORRECTION

PATENT NO. : 4,029,340
DATED : June 14, 1977
INVENTOR(S) : Charles R. Chelin

It is certified that error appears in the above—identified patent and that said Letters Patent are hereby corrected as shown below:

Column 4, line 23, before the comma (,) insert --structure--;

same line, cancel "structures".

Signed and Sealed this

Thirteenth Day of December 1977

[SEAL]

Attest:

RUTH C. MASON
Attesting Officer

LUTRELLE F. PARKER
Acting Commissioner of Patents and Trademarks